United States Patent
Komori et al.

(10) Patent No.: US 6,820,443 B2
(45) Date of Patent: Nov. 23, 2004

(54) METHOD OF PRODUCING CRT FUNNEL GLASS SUITABLE FOR GLASS RECYCLING, AND CRT FUNNEL GLASS

(75) Inventors: Hiroshi Komori, Otsu (JP); Hiroki Yamazaki, Koga-gun (JP)

(73) Assignee: Nippon Electric Glass Co., Ltd., Otsu (JP)

( * ) Notice: Subject to any disclaimer, the term of this patent is extended or adjusted under 35 U.S.C. 154(b) by 0 days.

(21) Appl. No.: 10/192,071

(22) Filed: Jul. 10, 2002

(65) Prior Publication Data

US 2003/0032543 A1 Feb. 13, 2003

(30) Foreign Application Priority Data

Jul. 13, 2001 (JP) .................................. 2001/213244

(51) Int. Cl.$^7$ .................... C03C 29/00; C03C 3/087
(52) U.S. Cl. ................ 65/28; 501/70; 501/71
(58) Field of Search .................. 501/55–79; 65/28; 313/477, 480

(56) References Cited

U.S. PATENT DOCUMENTS 2,901,366 A    8/1959  Duncan et al. ............... 501/71

FOREIGN PATENT DOCUMENTS

| EP | 1 152 450 | 11/2001 |
| JP | 086 278 | 3/2000 |
| JP | 143286 | 5/2000 |
| WO | WO 00 14022 | 3/2000 |
| WO | WO 00 46835 | 8/2000 |

Primary Examiner—Karl Group
Assistant Examiner—Elizabeth A. Bolden
(74) Attorney, Agent, or Firm—Collard & Roe, P.C.

(57) ABSTRACT

On producing CRT funnel glass from CRT panel glass or CRT frit, $Fe_2O_3$ is added in a range of 0.05 to 1 mass % so that the fluctuation of transmittance of light having a wavelength of 1,050 nm becomes 10% or less, at a thickness of 10 mm of the produced CRT funnel glass.

1 Claim, No Drawings

METHOD OF PRODUCING CRT FUNNEL GLASS SUITABLE FOR GLASS RECYCLING, AND CRT FUNNEL GLASS

BACKGROUND OF THE INVENTION

The present invention relates to a method of producing funnel glass for a CRT (cathode ray tube).

An envelope of a CRT comprises a panel portion for projecting video images, a tubular neck portion with an electron gun arranged therein, and a flare-shaped funnel portion connecting the panel portion and the neck portion with each other. The panel portion, the neck portion and the funnel portion are of glass. Electron beams emitted from the electron gun excite phosphors arranged on an inner surface of the panel portion to emit light so that the video images are projected on the panel portion. At the same time, X-rays are produced inside the CRT. X-rays adversely affect human bodies when leaked to the exterior of the CRT through the envelope. Therefore, the envelope is required to have a high X-ray absorbability.

CRTs are classified broadly into black-and-white CRTs and a color CRTs. Generally, the panel portion of a black-and-white CRT (hereinafter referred to as "black-and-white panel") requires that its glass is not colored due to electron beams and X-rays. Black-and-white panels are made of glass containing about 5 mass % of PbO. The panel portion of color CRTs (hereinafter referred to as "color panel") is used at higher voltages as compared with the black-and-white panel, and thus the requirement that its glass is not colored due to electron beams and X-rays is higher. Therefore, the color panel is made of glass containing no PbO but containing SrO and BaO. The funnel portion is required to have a high X-ray absorption coefficient, and thus is made of glass containing no less than 10 mass % of PbO. The panel portion and the funnel portion are joined together by welding in case of the black-and-white CRT, and by using a PbO frit made of glass containing PbO as a bonding agent in case of the color CRT.

In recent years, recycling of CRT glass members has been widely practiced. For this purpose, the glass members are first classified into black-and-white glass members and color glass members, which are then further classified into groups of panel glass members, funnel glass members and neck glass members. Then, the glass members of each group are immersed into a chemical liquid to remove phosphors, carbon DAGs, frits and so on. Subsequently, the glass members of each group are comminuted and the comminuted glass members are used as a recycled glass material for producing glass members of the same group.

The reason why the glass members should be strictly classified as described above is that, for example, if the glass members containing PbO, such as the black-and-white panels, are mixed into a glass material of the color panels, the color panels made of this glass material are subjected to coloration due to electron beams and X-rays.

Further, if the frits are not removed completely from the color panels, the same problem will arise.

However, the complete classification of the glass members into groups as described above requires much time and labor, and thus leads to an increase in production cost. Further, there is also the problem that demand for the black-and-white CRT glass is small and thus the production amount thereof is limited, so that complete recycling cannot be achieved with respect to the black-and-white CRT glass.

In view of the above, the color panels with the adhering frits and the black-and-white panels are now being recycled as a material of the funnel glass which is required to be PbO glass as described above.

The black-and-white panels, the color panels and the frits respectively contain colorants, such as NiO, $Co_3O_4$, $MnO_2$ and $Cr_2O_3$. Thus, if such recycling is performed, these colorants are mixed into the funnel glass. Even if CRTs are produced using funnel glass with those colorants mixed therein, no particular problems will arise in view of the characteristics thereof.

However, since the amount of the black-and-white panels, the color panels and the frits to be recycled is not fixed, the rate of the recycled glass contained in a material of the funnel glass changes and, following this, the amount of the contained colorants also changes. As a result, the infrared ray transmittance of the funnel glass is not fixed, so that upon producing the funnel glass in a glass melting furnace, the temperature at the bottom of the furnace fluctuates. Therefore, the flow of molten glass material is not stable, resulting in the possibility that the numbers of seeds and devitrifying stones increase to lower the product yield.

SUMMARY OF THE INVENTION

It is therefore an object of the present invention to provide a method of producing CRT funnel glass suitable for recycling glass containing a colorant.

Other objects of the present invention will become clear as the description proceeds.

The present inventors have found that even if a colorant contained in a frit, a color panel or a black-and-white panel enters into funnel glass, the infrared ray transmittance of the glass can be stabilized by adding a given amount of $Fe_2O_3$, depending on the amount of the colorant.

According to the present invention, there is provided a method of producing CRT funnel glass comprising the steps of preparing a glass material from at least one of CRT panel glass and CRT frit containing at least one colorant selected from the group consisting of NiO, $Co_3O_4$, $MnO_2$, $Cr_2O_3$, adding $Fe_2O_3$ in a range of 0.05 to 1 mass %, depending on the amount of the colorant, to produce a mixture of the glass material with $Fe_2O_3$, melting the mixture to produce a glass melt, and producing the CRT funnel glass from the glass melt such that, at a thickness of 10 mm, the CRT funnel glass has a fluctuation of transmittance of light having a wavelength of 1,050 nm of 10% or less.

Specifically, by adding a given amount of $Fe_2O_3$ depending on the amount of a colorant contained in the glass material, the infrared ray transmittance of the CRT funnel glass is stabilized. As a result, there can be obtained the CRT funnel glass whose infrared ray transmittance is stable, while its composition contains one or more of the colorants. Naturally, the obtained CRT funnel glass contains $Fe_2O_3$ in a range of 0.05 to 1 mass %.

As a result, the fluctuation of the temperature at the bottom of the melting furnace is suppressed to stabilize the flow of the molten glass material, so that the CRT funnel glass with less seeds and devitrifying stones can be obtained.

If the added amount of $Fe_2O_3$ is less than 0.05 mass %, the fluctuation of the infrared ray transmittance of the glass cannot be stabilized within 10% or less when the colorant amount fluctuates largely. On the other hand, if the added amount of $Fe_2O_3$ is greater than 1 mass %, the infrared ray transmittance of the glass becomes so low that the heat cannot reach the bottom of the melting furnace, thereby increasing the seeds and devitrifying stones. Preferably, the added amount of $Fe_2O_3$ falls within a range of 0.08 to 1 mass %, and more preferably, within a range of 0.1 to 0.9 mass %. For suppressing generation of the seeds and devitrifying stones by increasing the infrared ray transmittance of the glass to allow the heat to reach the bottom of the melting furnace, it is desirable that the transmittance of light with a wavelength of 1,050 nm in a thickness of 10 mm of the glass is set at 50% or greater, preferably 60% or greater, and more preferably 70% or greater.

The foregoing composition of the CRT funnel glass contains PbO in a range of 10 to 30 mass %. This produces an X-ray absorption coefficient of 40 cm$^{-1}$ or greater at 0.6 Å to provide the glass with a high X-ray shielding capability, and further achieves a viscosity of the glass suitable for the formation.

Preferably, the composition of the glass contains, in mass, 48 to 58% $SiO_2$, 0.5 to 6% $Al_2O_3$, 10 to 30% PbO, 0 to 5% MgO, 0 to 6% CaO, 0 to 9% SrO, 0 to 9% BaO, 3 to 9% $Na_2O_4$, to 11% $K_2O$, 0 to 3% $ZrO_2$, 0 to 5% ZnO, and 0.05 to 1% $Fe_2O_3$. The reason for this glass composition will be explained hereinbelow.

$SiO_2$ is a component serving as a network former of the glass. If the content of $SiO_2$ falls within a range of 48 to 58 mass %, the formation becomes easy, and further, the matching with the thermal expansion coefficient of neck glass is improved. Preferably, the content of $SiO_2$ falls within a range of 50 to 57 mass %.

$Al_2O_3$ is also a component serving as a network former of the glass. If the content of $Al_2O_3$ falls within a range of 0.5 to 6 mass %, the formation becomes easy, and further, the matching with the thermal expansion coefficient of the neck glass is improved. Preferably, the content of $Al_2O_3$ falls within a range of 1 to 5 mass %.

PbO is a component which improves the X-ray absorption coefficient of the glass. If the content of PbO falls within a range of 10 to 30 mass %, the X-ray absorbability is sufficient, and further, the viscosity of the glass is suitable for the formation. Preferably, the content of PbO falls within a range of 15 to 27 mass %.

MgO is a component serving to facilitate melting of the glass and to adjust the thermal expansion coefficient and the viscosity. If the content of MgO is 5 mass % or less, the glass is hard to be devitrified and the liquidus temperature is low, so that the formation becomes easy. Preferably, the content of MgO is 4 mass % or less.

CaO, like MgO, is a component serving to facilitate melting of the glass and to adjust the thermal expansion coefficient and the viscosity. If the content of CaO is 5 mass % or less, the glass is hard to be devitrified and the liquidus temperature is low, so that the formation becomes easy. Preferably, the content of CaO falls within a range of 1 to 5 mass %.

SrO and BaO are components serving to facilitate melting of the glass, to adjust the thermal expansion coefficient and the viscosity, and to improve the X-ray absorbability. If the content of each of SrO and BaO is 9 mass % or less, the glass is hard to be devitrified and the liquidus temperature is low, so that the formation becomes easy. Preferably, the content of each of SrO and BaO is 7 mass % or less.

$Na_2O$ is a component serving to adjust the thermal expansion coefficient and the viscosity. If the content of $Na_2O$ falls within a range of 3 to 9 mass %, the matching with the thermal expansion coefficient of the neck glass is improved, and further, the viscosity of the glass is suitable for the formation. Preferably, the content of $Na_2O$ falls within a range of 4 to 8 mass %.

$K_2O$, like $Na_2O$, is a component serving to adjust the thermal expansion coefficient and the viscosity. If the content of $K_2O$ falls within a range of 4 to 11 mass %, the matching with the thermal expansion coefficient of the neck glass is improved, and further, the viscosity of the glass is suitable for the formation. Preferably, the content of $K_2O$ falls within a range of 5 to 10 mass %.

$ZrO_2$ is a component which improves the X-ray absorption coefficient of the glass. If the content of $ZrO_2$ is 3 mass % or less, the glass is hard to be devitrified and the viscosity of the glass is not increased, so that the formation becomes easy. Preferably, the content of $ZrO_2$ is 2 mass % or less.

ZnO, when the content thereof is 5 mass % or less, improves the X-ray absorption coefficient of the glass and suppresses alkali elution. Preferably, the content of ZnO is 4 mass % or less.

If the frits, the color panels or black-and-white panels are recycled for a glass material of the funnel glass, it is not possible to avoid at least one of the colorants. If the amount of these colorants is too much, the infrared ray transmittance of the glass becomes too low. Thus, the heat cannot reach the bottom of the melting furnace. In view of this, it is desirable that the total amount of the colorants is 10,000 ppm or less.

DESCRIPTION OF THE PREFERRED EMBODIMENTS

The following examples show preferred embodiments of the present invention and comparative examples.

Table 1 shows a composition of panel glass and a composition of funnel glass.

TABLE 1

| composition (mass %) | PANEL | FUNNEL |
|---|---|---|
| $SiO_2$ | 61.45 | 51.00 |
| $Al_2O_3$ | 2.00 | 4.00 |
| PbO | — | 23.50 |
| MgO | — | 2.50 |
| CaO | — | 4.00 |
| SrO | 9.00 | — |
| BaO | 9.00 | — |
| $Na_2O$ | 7.50 | 7.50 |
| $K_2O$ | 7.50 | 8.00 |
| $ZrO_2$ | 1.50 | — |
| ZnO | 0.50 | — |
| $TiO_2$ | 0.50 | — |
| $Sb_2O_3$ | 0.50 | 0.50 |
| $CeO_2$ | 0.50 | — |
| $Fe_2O_3$ | 0.05 | 0.03 |
| NiO | 30 ppm | — |
| $Co_3O_4$ | 300 ppm | — |

Table 2 shows examples (samples Nos. 1 to 5) according to the preferred embodiments of the present invention, and Table 3 shows comparative examples (samples Nos. 6 to 10).

TABLE 2

| composition | EXAMPLES | | | | |
|---|---|---|---|---|---|
| (mass %) | No. 1 | No. 2 | No. 3 | No. 4 | No. 5 |
| $SiO_2$ | 51.0 | 51.4 | 52.9 | 53.7 | 55.8 |
| $Al_2O_3$ | 3.9 | 3.8 | 3.6 | 3.4 | 3.0 |
| PbO | 22.3 | 21.2 | 18.8 | 16.5 | 11.8 |
| MgO | 2.4 | 2.3 | 2.0 | 1.8 | 1.3 |
| CaO | 3.8 | 3.6 | 3.2 | 2.8 | 2.0 |
| SrO | 0.5 | 0.9 | 1.8 | 2.7 | 4.5 |
| BaO | 0.5 | 0.9 | 1.8 | 2.7 | 4.5 |
| $Na_2O$ | 6.6 | 6.6 | 6.7 | 6.8 | 7.0 |
| $K_2O$ | 8.0 | 8.0 | 7.9 | 7.9 | 7.8 |

TABLE 2-continued

| composition (mass %) | EXAMPLES | | | | |
|---|---|---|---|---|---|
| | No. 1 | No. 2 | No. 3 | No. 4 | No. 5 |
| $ZrO_2$ | 0.1 | 0.2 | 0.3 | 0.5 | 0.8 |
| ZnO | — | 0.1 | 0.1 | 0.2 | 0.3 |
| $TiO_2$ | — | 0.1 | 0.1 | 0.2 | 0.3 |
| $Sb_2O_3$ | 0.5 | 0.5 | 0.5 | 0.5 | 0.5 |
| $CeO_2$ | — | 0.1 | 0.1 | 0.2 | 0.3 |
| $Fe_2O_3$ | 0.4 | 0.3 | 0.2 | 0.1 | 0.1 |
| NiO | 15 ppm | 30 ppm | 60 ppm | 90 ppm | 150 ppm |
| $Co_3O_4$ | 2 ppm | 3 ppm | 6 ppm | 9 ppm | 15 ppm |
| panel using rate (%) | 5 | 10 | 20 | 30 | 50 |
| crucible bottom temperature (° C.) | 1400 | 1400 | 1400 | 1400 | 1400 |
| X-ray absorption coefficient (0.6 Å, $cm^{-1}$) | 65 | 64 | 60 | 57 | 50 |
| infrared ray transmittance (%) | 64 | 64 | 64 | 64 | 64 |

TABLE 3

| composition (mass %) | EXAMPLES | | | | |
|---|---|---|---|---|---|
| | No. 6 | No. 7 | No. 8 | No. 9 | No. 10 |
| $SiO_2$ | 51.37 | 51.67 | 53.07 | 53.76 | 55.86 |
| $Al_2O_3$ | 3.9 | 3.8 | 3.6 | 3.4 | 3.0 |
| PbO | 22.3 | 21.2 | 18.8 | 16.5 | 11.8 |
| MgO | 2.4 | 2.3 | 2.0 | 1.8 | 1.3 |
| CaO | 3.8 | 3.6 | 3.2 | 2.8 | 2.0 |
| SrO | 0.5 | 0.9 | 1.8 | 2.7 | 4.5 |
| BaO | 0.5 | 0.9 | 1.8 | 2.7 | 4.5 |
| $Na_2O$ | 6.6 | 6.6 | 6.7 | 6.8 | 7.0 |
| $K_2O$ | 8.0 | 8.0 | 7.9 | 7.9 | 7.8 |
| $ZrO_2$ | 0.1 | 0.2 | 0.3 | 0.5 | 0.8 |
| ZnO | — | 0.1 | 0.1 | 0.2 | 0.3 |
| $TiO_2$ | — | 0.1 | 0.1 | 0.2 | 0.3 |
| $Sb_2O_3$ | 0.5 | 0.5 | 0.5 | 0.5 | 0.5 |
| $CeO_2$ | — | 0.1 | 0.1 | 0.2 | 0.3 |
| $Fe_2O_3$ | 0.03 | 0.03 | 0.03 | 0.04 | 0.04 |
| NiO | 15 ppm | 30 ppm | 60 ppm | 90 ppm | 150 ppm |
| $Co_3O_4$ | 2 ppm | 3 ppm | 6 ppm | 9 ppm | 15 ppm |
| panel using rate (%) | 5 | 10 | 20 | 30 | 50 |
| crucible bottom temperature (° C.) | 1480 | 1460 | 1440 | 1420 | 1410 |
| X-ray absorption coefficient (0.6 Å, $cm^{-1}$) | 65 | 64 | 60 | 57 | 50 |
| infrared ray transmittance (%) | 84 | 81 | 77 | 74 | 69 |

Each of the samples given in Tables 2 and 3 was prepared in the following manner.

First, the panel glass having the composition defined in Table 1 was comminuted and mixed with a material batch at the using rate shown in Table 2 or 3 to prepare a funnel glass mixed batch. Then, the mixed batch was put into a clay crucible having a thermocouple arranged at the bottom thereof. Subsequently, the mixed batch was melted at 1,550° C. for 6 hours in a melting furnace wherein the crucible was heated only from above, and then the temperature at the bottom of the crucible was measured.

In the compositions shown in Tables 2 and 3, SrO, BaO, $ZrO_2$, ZnO, NiO and $Co_3O_4$ were included from the panel glass.

Then, for each of the samples thus obtained, the X-ray absorption coefficient and the infrared ray transmittance were measured. The results are shown in Tables 2 and 3.

The X-ray absorption coefficient was obtained by calculating the absorption coefficient at a wavelength of 0.6 Å with reference to the glass composition and the density.

The infrared ray transmittance was obtained by measuring the transmittance of light with a wavelength of 1,050 nm using an infrared spectrophotometer after each sample was subjected to optical polishing to have a thickness of 10 mm.

As seen from Table 2, with respect to the samples Nos. 1 to 5 of the examples according to the preferred embodiments, even when the total amount of the colorants changed, the infrared ray transmittance was kept constant by adjusting the amount of $Fe_2O_3$, so that the temperature of the bottom of the crucible was held constant. Further, the X-ray absorption coefficients were high, i.e. 50 $cm^{-1}$ or greater.

In contrast, with respect to the samples Nos. 6 to 10 of the comparative examples shown in Table 3, adjustment of the infrared ray transmittance using $Fe_2O_3$ was not carried out. Thus, as seen from Table 3, as the total amount of the colorants increases, the infrared ray transmittance was lowered and hence the temperature at the bottom of the crucible was lowered.

Then, the glass qualities were compared between glass obtained by putting the mixed batches of the samples Nos. 1 to 5 into a continuous melting furnace and melting them, and glass obtained by putting the mixed batches of the samples Nos. 6 to 10 into the continuous melting furnace and melting them.

As a result, in the case of using the mixed batches of the samples Nos. 1 to 5, there was no fluctuation of the infrared ray transmittance and thus no fluctuation of the temperature at the bottom of the melting furnace, so that generation of seeds and devitrifying stones in the glass were suppressed and a stable glass quality was obtained.

On the other hand, in the case of using the mixed batches of the samples Nos. 6 to 10, the infrared ray transmittance fluctuated by 15% to cause large fluctuation of the temperature at the bottom of the melting furnace, so that a large number of seeds and devitrifying stones were generated.

In the foregoing preferred embodiments, the panel glass with no adhering frit is used. However, the same method can also be used even when the panel glass with adhering frit containing $MnO_2$ and $Cr_2O_3$ is used. Further, when using the frit or the panel glass as a funnel glass material, PbO, $Al_2O_3$ or the like may be added to adjust the X-ray absorption coefficient and the viscosity to obtain desired characteristics.

What is claimed is:

1. A method of producing CRT funnel glass, comprising the steps of (1) preparing a glass material obtained from at least one of CRT panel glass and CRT frit containing at least one colorant selected from the group consisting of NiO, $Co_3O_4$, $MnO_2$, and $Cr_2O_3$, (2) adding a varying amount of $Fe_2O_3$ of said glass material in the range of 0.05–1 mass %, depending on the amount of the colorant, to produce a mixture of the glass material with $Fe_2O_3$, (3) melting said mixture to produce a glass melt, and (4) producing said CRT funnel glass from said glass melt such that, at a thickness of 10 mm, the CRT funnel glass has a fluctuation of transmittance of light at a wavelength of 1,050 nm of 10% or less.

* * * * *